United States Patent [19]

Longman

[11] Patent Number: 4,930,180
[45] Date of Patent: Jun. 5, 1990

[54] WINDSHIELD WIPER BLADE

[75] Inventor: Rodney K. Longman, Boca Raton, Fla.

[73] Assignee: Pylon Manufacturing Corporation, Deerfield Beach, Fla.

[21] Appl. No.: 205,144

[22] Filed: Jun. 10, 1988

[51] Int. Cl.$^5$ ............................................... B60S 1/04
[52] U.S. Cl. ............................... 15/250.42; 15/250.36
[58] Field of Search ........................ 15/250.36–250.42

[56] References Cited

U.S. PATENT DOCUMENTS

| | | |
|---|---|---|
| Re.29,392 | 9/1977 | Moorhead et al. . |
| 3,822,577 | 7/1974 | Roberts . |
| 3,879,794 | 4/1975 | Roberts, Jr. ........................ 15/250.42 |
| 3,885,265 | 5/1975 | Deibel et al. . |
| 3,911,523 | 10/1975 | Harbison et al. . |

FOREIGN PATENT DOCUMENTS 2557525  7/1985  France ............................... 15/250.42

*Primary Examiner*—Peter Feldman
*Attorney, Agent, or Firm*—Edgar A. Zarins; Malcolm L. Sutherland

[57] ABSTRACT

A windshield wiper blade universally adaptable to engage different pressure distributing superstructures having claws to retain the blade assembly. The elements of the wiper blade can be varied in order to accommodate the claw width and head clearance of the superstructure. The windshield wiper blade includes a backing member having a channel to receive the bead of the wiper element and an upper slot to receive a removable adapter. The adapter has an upper flange adapted to be received in the claws of various superstructures while the adapter can be removed to accommodate still other superstructures.

10 Claims, 2 Drawing Sheets

WINDSHIELD WIPER BLADE

BACKGROUND OF THE INVENTION

I. Field of the Invention

This invention relates to windshield wiper blade structures and, in particular, to a windshield wiper blade having a backing member for a resilient wiping element adaptable to superstructures having retaining claws of different sizes and configurations.

II. Description of the Prior Art

Whereas new vehicles are provided with wiper arms, superstructures, and wiping elements it is recommended that the wiping elements be periodically replaced. The replacement blade or "refill" is generally designed to be used with as many blade superstructures as possible. Nevertheless, with the various vehicle manufacturers and blade superstructures most blade refills can only be utilized with a few superstructures. In addition, many manufacturers of wiper blades design superstructures so that they will accept only their own blades. However, several universal wiper blade refills have been developed which can be used in a large number, but not all, wiper blade superstructures.

The superstructure normally includes a plurality of longitudinally spaced claws adapted to engage the lateral edges of the backing member. The claws straddle the backing member and, in order to fit, the lateral spacing of the claws must fit the lateral width of the backing member. In addition, there must be sufficient clearance in the claw to accommodate the retaining bead of the wiper element. Past known universal refills have compromised the width and bead clearance to accommodate a majority of blade configurations. However, refill blades adapted for all blade superstructures have not been developed.

SUMMARY OF THE PRESENT INVENTION

The present invention overcomes the disadvantages of the prior known windshield wiper blades by providing a wiper blade construction adaptable to different wiper superstructures.

The windshield wiper blade embodying the present invention includes a backing member which receives the wiper element and includes a channel to accommodate the retaining bead of the element. The backing member has an upper flange with laterally spaced slots for receiving the claws of the widest superstructures. A slot formed in the top of the backing member selectively receives an adapter which accommodates still other superstructures having narrower or wider claw widths. The flange width forming the top of the adapter can be varied to fit different claw widths. Accordingly, the windshield wiper blade of the present invention can be assembled to fit all superstructures thereby substantially reducing manufacturing costs and simplifying replacement of worn blades.

Other objects, features, and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views, and in which.

DETAILED DESCRIPTION OF A PREFERRED EMBODIMENT OF THE PRESENT INVENTION

Figure 1:
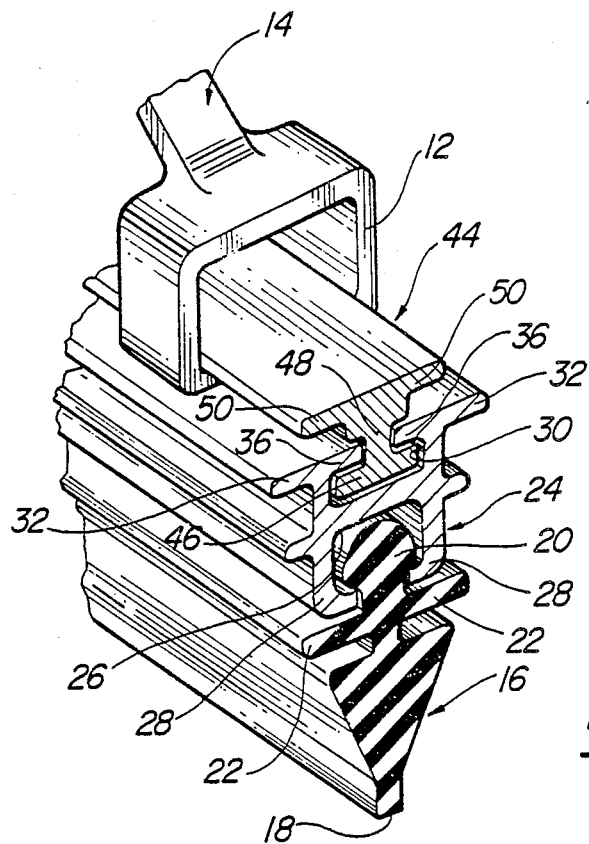
FIG. 1 is a partial elevated perspective of the windshield wiper blade embodying the present invention secured to a first superstructure claw.
Figure 3:
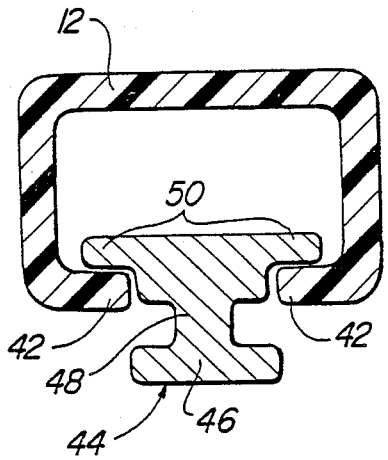
FIG. 3 is a cross-sectional view of the first superstructure claw secured to the adapter forming a part of the present invention.

Referring to the drawings, there is shown a windshield wiper blade 10 embodying the present invention. The wiper blade 10 is in the nature of a universal refill adapted to be mounted to the claws 12 of a pressure-distributing superstructure 14 attached to a wiper arm of the vehicle. The superstructure 14 ensures that the wiping edge of the blade 10 is maintained against the windshield. Difference in the design and manufacture of wiper superstructures make it difficult to interchangeably utilize refill blades with all superstructures. The wiper blade 10 of the present invention provides a universal refill adaptable to pressure- distributing superstructures 14 having a plurality of spaced apart claws 12 with different claw widths (A and C) and clearance (B). The configuration of the claws 12 normally determine these clearances.

Figure 2:
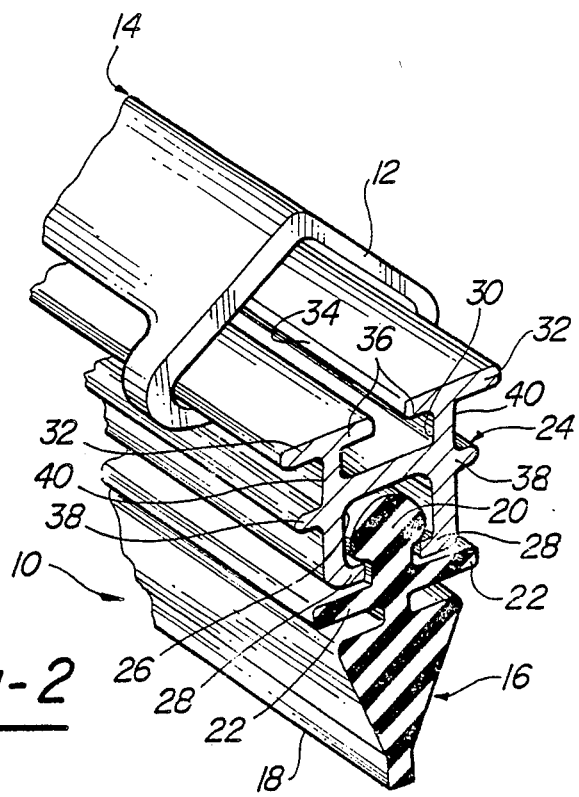
FIG. 2 is a partial elevated perspective of the windshield wiper blade of the present invention secured to a second superstructure claw.
Figure 4:
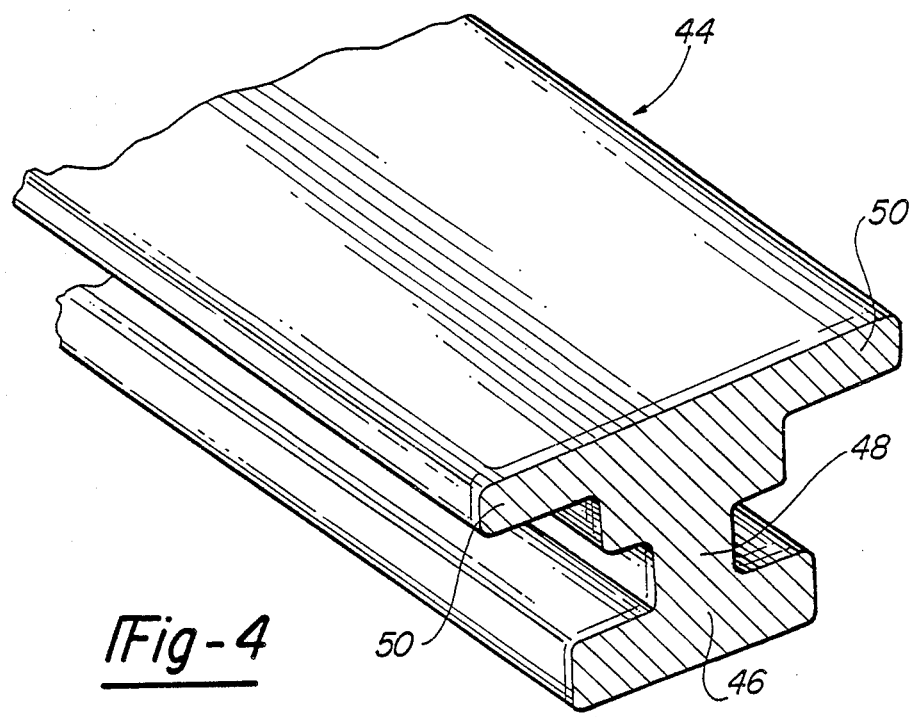
FIG. 4 is a partial elevated perspective of the adapter of the present invention.

Referring now to FIGS. 1 and 2, the wiper blade 10 is shown attached to two different superstructure claws 12. The wiper blade 10 includes an elastomeric wiping element 16 having a wiping edge 18 which engages the windshield and a retaining bead 20 which extends along the upper longitudinal edge. The wiping element 16 may also include outwardly extending shoulders 22 intermediate the bead 20 and the wiping edge 18 although the wiping element 16 may be any of the configurations developed for use in refill units. The wiping element 16 is retained by a backing member 24 which includes a lower channel 26 for receiving the retaining bead 20 of the wiping element 16. The elongated channel 26 includes a narrow portion open to the bottom of the backing member 24 and formed by a pair of inwardly extending flanges 28 which prevent removal of the retaining bead 20 of the wiping element 16 through the narrow opening. However, the wiping element 16 can be removed from the backing member 24 by sliding the element 16 longitudinally with respect to the backing member 24.

Figure 5:
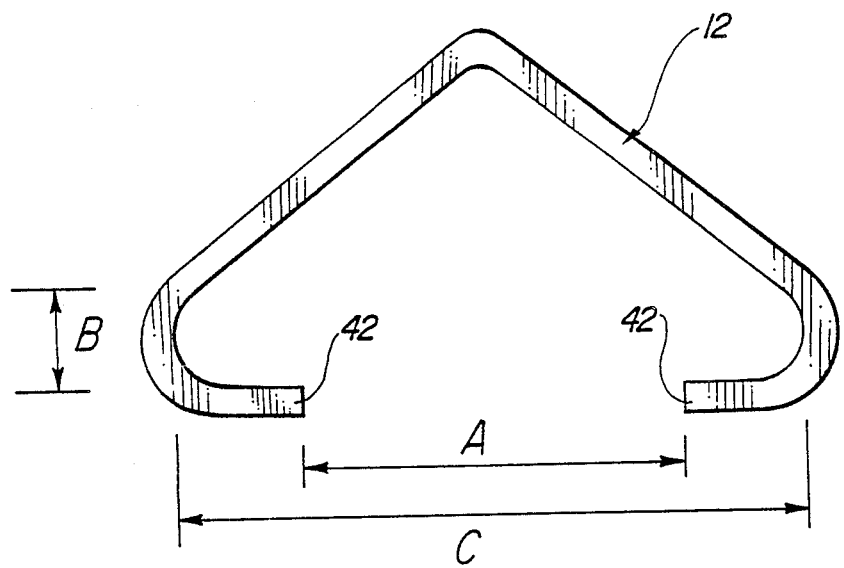
FIG. 5 is an end view of a superstructure claw showing the critical dimensions thereof.

Referring still to FIGS. 1 and 2, the backing member 24 includes a longitudinal slot 30 open to the top of the backing member 24 and a pair of upper flanges 32 extending laterally outwardly on opposite sides of the slot 30. The slot 30 includes a reduced neck portion 34 formed by inwardly extending flanges 36 which preferably are formed substantially planar with the outwardly extending flanges 32. The outwardly extending flanges 32 provide the wiper blade 10 with a first width adapted to be received in a superstructure claw 12 having a substantially identical width C as shown in FIG. 5. The outwardly extending flanges 32 cooperate with intermediate flanges 38 to form a reduced width channel 40 adapted to receive inwardly extending ends 42 of the claw 12 having a width A. As a result, the wiper blade 10 shown in FIG. 2 can only be detached from the superstructure by longitudinally sliding the wiper blade 10 until the claws 12 move past the end of the backing member 24. Thus, with the backing member 24 and wiping element 16, the wiper blade 10 can be attached to a first superstructure claw 12 having predetermined widths A and C. The backing member 24 will also accommodate claws 12 having a relatively narrow bead clearance B.

Although the backing member 24 by itself will facilitate attachment of the wiping element 16 to many superstructure claws 12, manufacturers have increasingly attempted to monopolize the refill units which can be utilized with their superstructures by varying the configuration of the claws 12 which may vary the dimensions A, B & C of the claw 12. In the event the width of the backing member 24 cannot accommodate the particular claw 12, an elongated adapter 44 may be attached to the backing member 24 to accommodate the claw dimensions. The adapter 44 includes a lower flange 46 which is received within the slot 30 of the backing member 24. The lower flange 46 of the adapter 44 includes a narrow neck portion 48 which fits between the inwardly extending flanges 36 of the slot 30. As a result, the adapter 44 cannot be vertically removed from the backing member 24 but must be longitudinally displaced. Accordingly, a refill package may include several adapters 44 which have identical lower flanges 46 to matingly fit with the slot 30 of the backing member 24 but which can accommodate different claw widths. The adapter 44 includes a pair of outwardly extending upper flanges 50 having a second width adapted to engage claws 12 having a different width C. When the adapter 44 is mounted to the backing member 24, the flanges 50 cooperate with the top of the backing member 24 to form a reduced width portion to accommodate the ends 42 of the claw 12 having a width A. The configuration of the adapter 44 can also be varied to accommodate claws 12 having different bead clearances B.

Thus, the present invention provides a universal windshield wiper blade adapted to be interchangeably attached to different pressure-distributing superstructures 14 which have claws 12 with a determinable width and height. In a first instance, the wiper blade 10 can be utilized without the adapter 44 such that the claw of the superstructure 14 directly engages the backing member 24. With superstructures 14 having claws 12 with wider or narrower widths than the backing member 24, an appropriate adapter 44 can be mounted to the backing member 24 in order to accommodate the claw configuration. A refill blade package may be provided with one or more adapters so that the same backing member 24 and wiper element 16 can be utilized with the different superstructures. As a result, manufacturing costs are reduced while the purchaser is ensured of buying a wiper refill which will fit the upper superstructure on the vehicle.

The foregoing detailed description has been given for clearness of understanding only and no unnecessary limitations should be understood therefrom as some modifications will be obvious to those skilled in the art without departing from the scope and spirit of the appended claims:

I claim:

1. A windshield wiper blade adapted to be interchangeably attached to a pressure-distributing superstructure having a spaced apart plurality of claws, said wiper blade comprising:
    a flexible windshield wiping element;
    an elongated backing member retaining said wiping element, said backing member having an elongated slot open to the top of said backing member and a pair of upper flanges extending laterally outwardly in opposite directions; and
    an elongated adapter having an elongated flange formed at the lower end thereof and a pair of upper flanges extending laterally outwardly in opposite directions, said lower elongated flange selectively receivable within said elongated slot of said backing member to selectively mount said adapter to said backing member;
    said upper flanges of said backing member having a first width for engaging the claws of a superstructure and said upper flanges of said adapter having a second width for engaging the claws of another superstructure, said adapter selectively mountable to said backing member whereby said windshield wiper blade may be selectively attachable to different pressure-distributing superstructures.

2. The wiper blade as defined in claim 1 wherein said wiping element includes a wiping edge and an elongated retaining bead, said backing member having an elongated channel for receiving said retaining bead to removably attach said wiping element to said backing member.

3. The wiper blade as defined in claim 1 wherein said elongated slot of said backing member includes a neck portion formed by a pair of inwardly extending flanges which prevents vertical extraction of said adapter from said backing member.

4. The wiper blade as defined in claim 1 wherein said width of said outwardly extending flanges of said adapter is less than said width of said outwardly extending flanges of said backing member, said adapter being received by superstructure claws having a first width and said backing member being received by superstructure claws having a second width, said adapter being selectively removable from said backing element such that said wiper blade may be attached to different pressure-distributing superstructures having different claw widths.

5. A windshield wiper blade adapted to be interchangeably attached to a pressure-distributing superstructure having a spaced apart plurality of claws, said wiper blade comprising:
    a flexible windshield wiping element having a wiping edge and a refining bead;
    an elongated backing member having an elongated channel open to the bottom thereof for receiving said retaining bead at said wiping element, said backing member including a pair of upper flanges extending laterally outwardly in opposite directions and a pair of flanges extending laterally inwardly to form an elongated slot open to the top of said backing member, said outwardly extending flanges adapted to selectively engage superstructure claws having a first width; and
    an elongated adapter having an elongated flange formed at the lower end thereof and a pair of upper flanges extending laterally outwardly in opposite directions, said lower elongated flange selectively receivable within said elongated slot of said backing member to selectively mount said adapter to said backing member, said outwardly extending flanges adapted to selectively engage superstructure claws having a second width;

said adapter mountable to said backing member to attach said wiper blade to superstructure claws having a second width and said adapter removable from said backing member to attach said wiper blade to superstructure claws having a first width whereby said windshield wiper blade may be selectively attachable to different pressure-distributing superstructures.

6. The wiper blade as defined in claim 5 wherein the width of said outwardly extending flanges of said adapter is less than the width of said outwardly extending flanges of said backing member.

7. The wiper blades as defined in claim 5 wherein the width of said outwardly extending flanges of said adapter is greater than the width of said outwardly extending flanges of said backing member.

8. The wiper blade as defined in claim 5 wherein said elongated channel of said backing member includes inwardly extending flanges to prevent vertical removal of said retaining bead from said channel.

9. In a windshield wiper blade assembly including a pressure-distributing superstructure having a plurality of spaced apart claws and a flexible windshield wiping element having a wiping edge and a retaining bead, a backing assembly for interchangeably attaching the wiping element to different pressure-distributing superstructures, the different superstructures having different width claws for receiving said backing assembly, said backing assembly comprising:

an elongated backing member having an elongated channel open to the bottom thereof for receiving the retaining bead of the wiper element, said backing member including a pair of upper flanges extending laterally outwardly in opposite directions and an elongated slot open to the top of said backing member formed intermediate said flanges; and an elongated adapter selectively attachable to said backing member, said adapter including a pair of upper flanges extending laterally outwardly in opposite directions and an elongated flange formed at the lower end thereof, said flange received in said slot of said backing member to selectively attach said adapter to said backing member.

said upper flanges of said backing member having a first predetermined width for mounting said backing member and wiping element to superstructure claws of a similar width and said upper flanges of said adapter having a second predetermined width for mounting said adapter, backing member and wiping element to superstructure claws of a similar width.

10. The backing assembly as defined in claim 9 wherein said elongated slot of said backing member includes a pair of inwardly extending flanges to form a reduced neck portion of said slot, said neck portion preventing vertical retraction of said adapter from said backing member.

* * * * *